(12) United States Patent
Connor et al.

(10) Patent No.: US 7,698,110 B2
(45) Date of Patent: Apr. 13, 2010

(54) METHOD FOR DYNAMICALLY GENERATING MULTIPLE VIEWS OF THREE-DIMENSIONAL MODELS FOR UTILITY NETWORKS

(75) Inventors: Edward James Connor, Manchester, NH (US); Craig Storms, Concord, NH (US); Michael A. Appolo, III, Derry, NH (US); Tim Burnham, New Boston, NH (US); Anandaraja Devan, Manchester, NH (US); Steve Milligan, Merrimack, NH (US); Michael C. Rogerson, Manchester, NH (US); Kenneth W. Spalding, III, Mont Vernon, NH (US)

(73) Assignee: AUTODESK, Inc., San Rafael, CA (US)

( * ) Notice: Subject to any disclaimer, the term of this patent is extended or adjusted under 35 U.S.C. 154(b) by 946 days.

(21) Appl. No.: 11/250,239

(22) Filed: Oct. 13, 2005

(65) Prior Publication Data
US 2007/0089087 A1 Apr. 19, 2007

(51) Int. Cl.
G06F 17/50 (2006.01)

(52) U.S. Cl. .............................. 703/1; 703/6

(58) Field of Classification Search ............. 703/1; 717/105; 706/6
See application file for complete search history.

(56) References Cited

U.S. PATENT DOCUMENTS

2005/0251494 A1* 11/2005 Maria Jansen ................. 707/1

* cited by examiner

Primary Examiner—Paul L Rodriguez
Assistant Examiner—Luke Osborne
(74) Attorney, Agent, or Firm—Patterson & Sheridan, LLP (57) ABSTRACT

Embodiments of the invention provide a method, apparatus and article of manufacture for modeling a variety of three-dimensional (3D) utility networks constructed from individual network part elements. In one embodiment, users may construct a utility network by selecting and assembling a network of inter-connected parts, where each part is selected from a pipe and structure list. Connectivity among parts is established through part placement. Structure and connected pipe properties may be managed as a single property set. As parts are placed in the utility network, auto-sizing logic resizes existing structures to connected pipes. Pipes and structures are represented by part model data that defines a set of common behavior and properties. When a user modifies part model data or property sets or moves inter-connected parts, a logic component resizes and automatically updates any associated two-dimensional and three-dimensional views of the utility network.

19 Claims, 8 Drawing Sheets

METHOD FOR DYNAMICALLY GENERATING MULTIPLE VIEWS OF THREE-DIMENSIONAL MODELS FOR UTILITY NETWORKS

BACKGROUND OF THE INVENTION

1. Field of the Invention

The present invention generally relates to computer software. More specifically, the present invention relates to computer software applications configured to facilitate the interactive design of three-dimensional (3D) models of utility networks.

2. Description of the Related Art

Currently, computer aided design (CAD) applications allow a designer or engineer to compose graphical representations of utility networks. For example, a user interacting with a CAD application may generate a model of a utility network by drawing simple 2D objects to represent components such as pipes, conduits, manhole covers, etc. Common 2D drawing objects include simple lines and arcs, etc. Additionally, some CAD applications may provide groupings of 2D objects used to model certain real-world structures (e.g., a collection of lines and ellipses to represent a cylinder). The user positions these 2D drawing objects relative to one another to generate the graphical representation of the utility network.

Additionally, a given 2D drawing object may be displayed with a label that presents information regarding the real-world component being represented by the 2D drawing object. Such attributes may be part of engineering and construction documentation generated from the 2D drawing. For example, a line representing a pipe may be displayed with a label that provides attributes such as the diameter, length, inner diameter etc., of the pipe.

Typically, the user of a CAD application will create many different views to represent the same utility network from different perspectives. For example, a plan view may provide a "top-down" perspective and a profile view may provide a cross-sectional perspective of the utility network. To modify the utility network represented by the 2D drawing objects, the designer or engineer may have to edit one or more of the 2D drawing objects within an individual view. For example, if a user changes the diameter of a 2D graphical object representing a pipe displayed in a profile view, the user may also have to determine what other changes have to be made to the 2D drawing objects in the profile view to account for this modification. Further, the user must also make similar modifications to other views, such as a plan view. The editing process is thus quite tedious and labor intensive.

Furthermore, the 2D graphics objects such as lines and curves only provide a crude representation of the network parts and thus the utility network and do not adequately describe or portray the actual real-world parts being used to construct the utility network. As stated, users often compose 2D graphical models to generate engineering and construction documentation. For example, a user may compose a plan view that includes labels or annotations that indicate the size, type, manufacturer, model number, etc. for a particular utility network component. In addition to the requirement that multiple views may have to be modified to reflect a desired change, a user may also have to update the labels or annotations provided with a given view. Because modifications to 2D drawing objects (and any attributes or annotation labels) must be replicated individually within each view, the process is both time consuming and error-prone.

Accordingly, the crude 2D drawing objects fail to reflect the real-world characteristics of utility network components. Moreover, because views are created independently from one another, any changes made for one view requires other views to be updated individually.

SUMMARY OF THE INVENTION

Embodiments of the invention provide a method, apparatus, and article of manufacture that allows for the efficient composition of three-dimensional models (3D models) of a utility network. In one embodiment, a 3D model may be composed from many virtual network part objects (or more simply, just "parts"). This allows a utility network to be modeled as a set of inter-connected network parts representing, for example, pipes, wires, conduit, manholes, catch basins, pumps, valves, transformers, etc., rather than as a set of 2D drawing objects. Network parts may be associated with a set of properties related to both an individual part and to other parts connected together throughout the topology of the utility network. Part objects in the 3D model may be aggregated to include surrounding part objects, allowing the aggregation to be managed as an interconnected group.

The parts available for a given 3D model are provided through a network part list, and part connectivity among network parts is established through part placement. Part placement is the process where a user specifies 3D coordinates to position a network part in the 3D model. In one embodiment, a user places a network part in an approximate location using drag-and-drop techniques, and the CAD application may be configured to calculate a final position based on the "drop" location and any rules specified for a particular network part or 3D model.

Depending on the application, network parts used to compose the 3D model may be developed specifically for a given project or may be selected from an external catalog and configured for a given project. For example, a project may specify a known set of pipe sizes and structures that have been approved for the project. Network parts corresponding to these real-world components may be made available to the user through the network part list. In addition, parts may also be grouped into families (e.g. 10", 12", and 14" pipe available form a common supplier).

Part rules for layout and editing behavior may be defined, and the exact look and feel (e.g. part texturing and shading) required for construction documents may specified as parts are added into the model. Layout and editing jigs may be provided to guide a user in placing a particular part within a 3D model. For example, a 12" pipe may be placed with a new catch basin structure, or the pipe may be connected to an existing structure in the model if user input occurs at or near the existing structure in the 3D model.

As parts are placed within the 3D model, automated resizing of structures already present in the 3D model occurs to match these structures with the newly added network parts. For example, a pipe length may be adjusted to maintain a connection with a catch basin structure. During part layout, part selection may be made from a predefined list of network parts, and layout jigs may be provided to guide user input for part placement and part connectivity. Regardless of the active view used to modify and add network parts, the underlying 3D model remains active throughout the editing process. For each part inserted into a utility network model, the CAD application may be configured to generate a graphical representation that is sized and shaped to approximate the real-world part and to connect it with other network parts in the model.

In addition, modifications made to a selected network part may be translated throughout the utility network, and to any view of the utility network generated from the 3D model. For example, catch basins and manholes typically connect to surrounding pipes and have intrinsic properties such as height, diameter, material, etc. and also include properties that reflect the connected pipes (e.g., each connected pipe has a size, inflow or outflow, direction etc.). When a user modifies the attributes or position of a network part within a utility network, interconnected parts may also move automatically, and the pipe end points may shift position to maintain connectivity and relative position. At the same time, data attributes corresponding to these parts may be updated to reflect modifications made to the network part. Further, one part may itself be provided as a composite of other parts, such as a catch basin composed from a barrel, collar, cap, and manhole cover.

The combined set of properties may be managed as a single property set which may be queried and displayed on the a graphical user interface (GUI) of the CAD application, exported as data for regarding one or more connected parts, or displayed on labels generated in construction documentation.

Additionally, a completed 3D model may be used to generate 2D construction and engineering documentation related to the model reflecting the attributes and properties of the parts included in the 3D model. Embodiments of the invention improve upon how parts are represented graphically, how parts are provided to users of a CAD application for composing the 3D model, and improve the reliability and speed of editing or revising 2D construction and engineering documentation. Thus, embodiments of the invention speed access to part editing and display of connected part properties and provide automatic updating of all views of the utility network as the utility model is changed (e.g., pipes added or removed, resized, moved to new orientation or depth. etc.). Editing of the model may be performed from any view thereof (e.g., a plan, a model or a profile view) and the results will automatically be reflected in other views of the utility network, without the user intervention required by current systems.

DETAILED DESCRIPTION OF THE PREFERRED EMBODIMENTS

Embodiments of the invention provide a method, apparatus, and article of manufacture for creating a computer-generated three-dimensional model (3D model) of a utility network that is composed from many network part objects (or more simply, just "parts"). Each part inserted into a 3D model may correspond to a real-world component of a utility network. For example, embodiments of the invention may be used to model a utility network such as a gravity pipe system, etc using network parts such as pipes, manholes, catch basins and storm sewers. However, embodiments of the invention are not limited to modeling utility networks of any single type and may be extended to other utility networks. For example, embodiments of the invention described herein may be adapted to model utility networks such as telecommunications networks, pipeline networks, power grid networks etc.

In one embodiment, users of a CAD application may be provided with a catalog of network parts or part families that may be used to compose the 3D model. The CAD application may be configured to allow a user to dynamically size and resize the network parts within the 3D model. Typically, the network parts themselves, represent real-world constructs (e.g., pipes, catch basins, manholes, etc.). Further, many 2D graphical views may be generated using a 3D model, such as various, plan, profile, and section views.

When the properties for one part are modified, other parts in the 3D model may be automatically updated. Any part visible from a given view may be selected and modified. When a user modifies a part within one view, other views are also dynamically updated to reflect these modifications. Similarly, the attributes and annotations regarding a given part may be modified from a single view, and every view of the model that includes the part may also be updated without requiring any further actions by the user.

Figure 1:
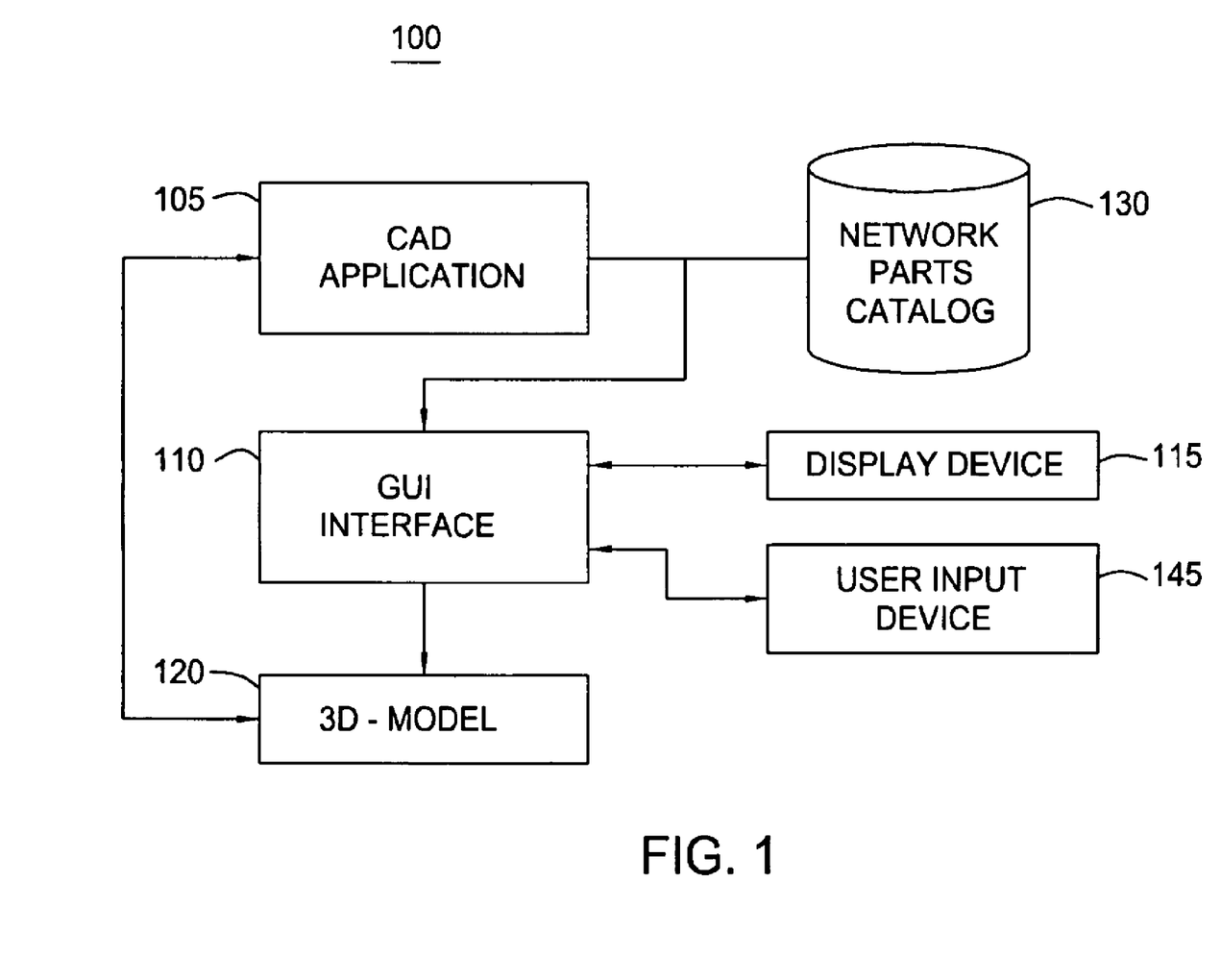
FIG. 1 is a block diagram illustrating a system for composing a 3D computer model of a utility network, according to one embodiment of the invention.

FIG. 1 is a functional block diagram illustrating an exemplary CAD environment 100 for generating a 3D computer model 120 of a utility network. In one embodiment, the components illustrated in environment 100 include computer software applications executing on existing computer systems, e.g., desktop computers, server computers, laptop computers, tablet computers, and the like. The software applications described herein, however, are not limited to any currently existing computing environment or programming language, and may be adapted to take advantage of new computing systems as they become available.

Additionally, the components illustrated in FIG. 1 may be executing on distributed systems communicating over computer networks including local area networks or large, wide area networks, such as the Internet. For example, a graphical user interface 110 may include a software program executing on a client computer system communicating with a CAD application 105 and a network parts catalog 130 residing on a networked server computer.

As shown, the CAD environment 100 includes, without limitation, CAD application program 105, graphical user interface 110, 3D model 120, user input devices 145, display device 115, and network parts catalog 130.

In one embodiment, the CAD application 105 is a computer program configured to allow a user interacting with GUI interface 110 to generate a 3D model 120. Preferably, the Civil 3D® application program and associated utilities available from Autodesk®, Inc. may be used. CAD application 105 stores the all the data, attributes, properties, and geometry data regarding to the real world structure being modeled in 3D model 120.

The graphical user interface 110 may provide GUI elements that allow a user to select, add, and modify the network parts (and part attributes) included in the 3D model 120. As a user specifies the characteristics of the utility network being modeled, 3D display device 115 provides a visual representation of the 3D model 120. The data for the 3D model 120 may be used as to generate the various views or graphical representations of the 3D model 120 as well as to generate 2D engineering and construction documentation for the 3D model 120. Although distinct from one another, each view (e.g., profile, plan or a cross-section view) is generated from a common set of network parts data. Input devices 145 allow a user to interact with the 3D model 120 and GUI interface 110. Typically, user input devices 145 include a mouse pointing device and a keyboard, and display device 115 is a CRT monitor or LCD display.

The network parts catalog 130 provides a master collection of parts available for use in composing a 3D model 120 of a utility network. Parts in the catalog may be fixed, single-size parts or part of a parametric part family. Each network part in catalog 130 provides an individual component that may be selected as an entity for inclusion in 3D model 120. Importantly, parts may themselves be defined as a composite of multiple parts that may be managed as a single entity.

In one embodiment, the parts catalog 130 may include network parts representing the pipes, structures, and fittings of a gravity based utility network. A "pipe" is a network part serving to move fluids from one point to another. In one embodiment, the CAD application 105 models a pipe network part by sweeping the cross-sectional shape of the pipe along a base curve, which may be a line for a straight pipe, or a more complex curve. Examples of "pipe" network parts include: circular pipes, elliptical pipes, rectangular pipes, egg-shaped pipes, etc. "Pipe" network parts may be used to connect structures, and a "structure" is a network part serving a specific engineering function in the system. Examples of "structure" network parts include manholes, catch basins, headwalls, flared end sections, etc. "Fittings" and "junctions" are network parts serving to branch pipe flow or alter flow direction, examples include, elbow, Wye, tee, cross, etc. To model other utility networks, a different parts catalog may be provided.

In one embodiment, a 3D model 120 may include data representing one or more utility networks. In turn, each utility network may be constructed using a collection of network part elements. Further, in some cases a given network part element may itself comprise a composite of two or more network parts that may be manipulated by a user as a single entity. Each of these elements used to construct a 3D model of a utility network is discussed more fully below in FIGS. 2-4.

Figure 2:
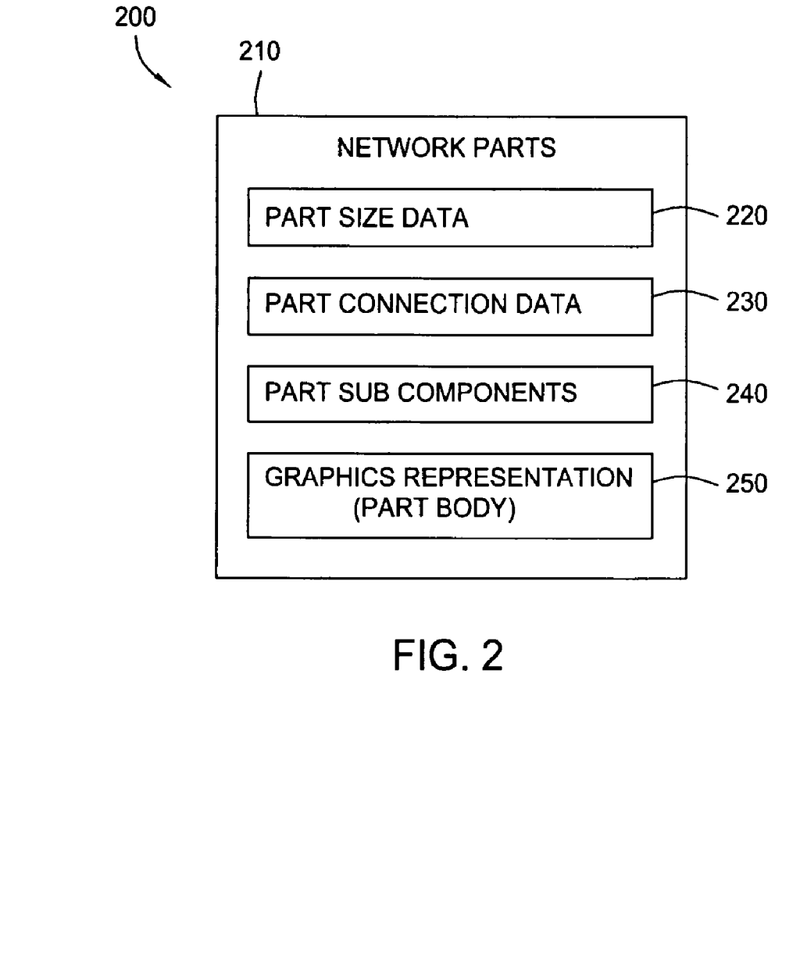
FIG. 2 is a block diagram illustrating data elements used to define a network part that may be added to 3D model of a utility network, according to one embodiment of the invention.

FIG. 2 is a block diagram 200 illustrating data elements used to define a network part that may be added to 3D model of a utility network, according to one embodiment of the invention. Illustratively, network part 210 may include data elements such as network part size data 220, part connection data 230, part sub components 240 and part body 250. Each network part 210 may be defined using some or all of these data elements (220-250). Further, each network part reflects properties of the real-world object corresponding to the part. Therefore, the 3D model 120 composed from the network parts has characteristics mirroring those of a real world utility network.

The part size data 220 may include a data record used to store all size parameters and location parameters of a network part 210 that has been added to a 3D model 120. The part size data may be fixed for a given network part or may be parametric. For example, parametric data may include size values selected from a pre-defined list or selected from a given range. Alternatively, multiple parameters may be grouped in a table and be selected together as a row, or size values may be defined as a calculation dependent on other parameter values.

Once a network part 210 is integrated into a particular 3D model 120, part connection data may be used to manage connections between the parts 210 and other parts in the 3D model 120. For example, each network part 210 may have one or more connections to other parts in the 3D model. In one embodiment, a network part 210 may itself be composed of other network parts. Accordingly, subcomponent data 240 may provide a list of one or more other parts integrated as a single entity. Such a network part may be provided by the catalog 120. Alternatively, the user interface 110 may allow users to group multiple network parts together, and subsequently manipulate the group as a single network part entity.

The part body 250 provides a 3D graphical image representing the part that may be used in the 3D model. The part body 250 may also include model data such as part-part interference, part volume, connection rules, etc. In one embodiment, the graphical representation may include data defining a bounding shape that provides an approximate 3D body representing the part as a cylinder, box, or spherical solid, or an indication of a routine used to generate the approximate 3D body from part size data 220. The graphical representation provides an approximation of the real world appearance of a particular network part. Additionally, one individual part may itself be composed from other parts provided by the parts catalog 130.

Figure 3:
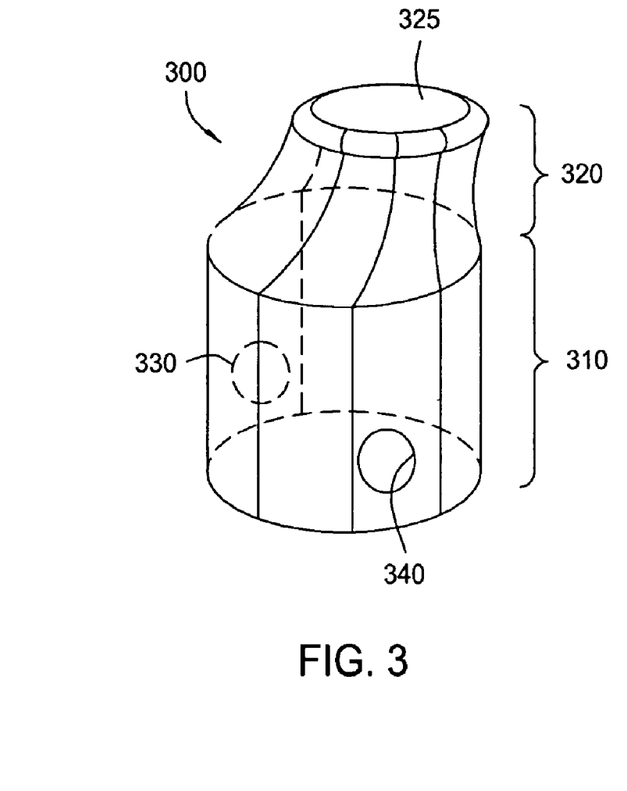
FIG. 3 illustrates an exemplary graphical representation of a network part.

FIG. 3 shows a graphical representation of a catch basin 300 defined as a composite of other network parts, including a barrel section 310, an eccentric barrel cap 320, and a manhole cover 325. Additionally, the barrel section 310 includes inlet/outlet ports 330 and 340. Each of these components may itself be a network part that may be individually manipulated. Further, the catch basin 300 may be selected as a composite network part and inserted into a 3D model 120. The coordinates in the 3D model where the catch basin 300 is inserted may be selected by the user creating the utility model. When placed at a particular location, the user may also select to connect the catch basin 300 with other network parts already present in the 3D model. For example, a user may specify an existing pipe structure be connected to inlet 330. In doing so, the size and position of the existing pipe structure may be modified by the CAD application 105 to reflect the new connection.

Figure 4:
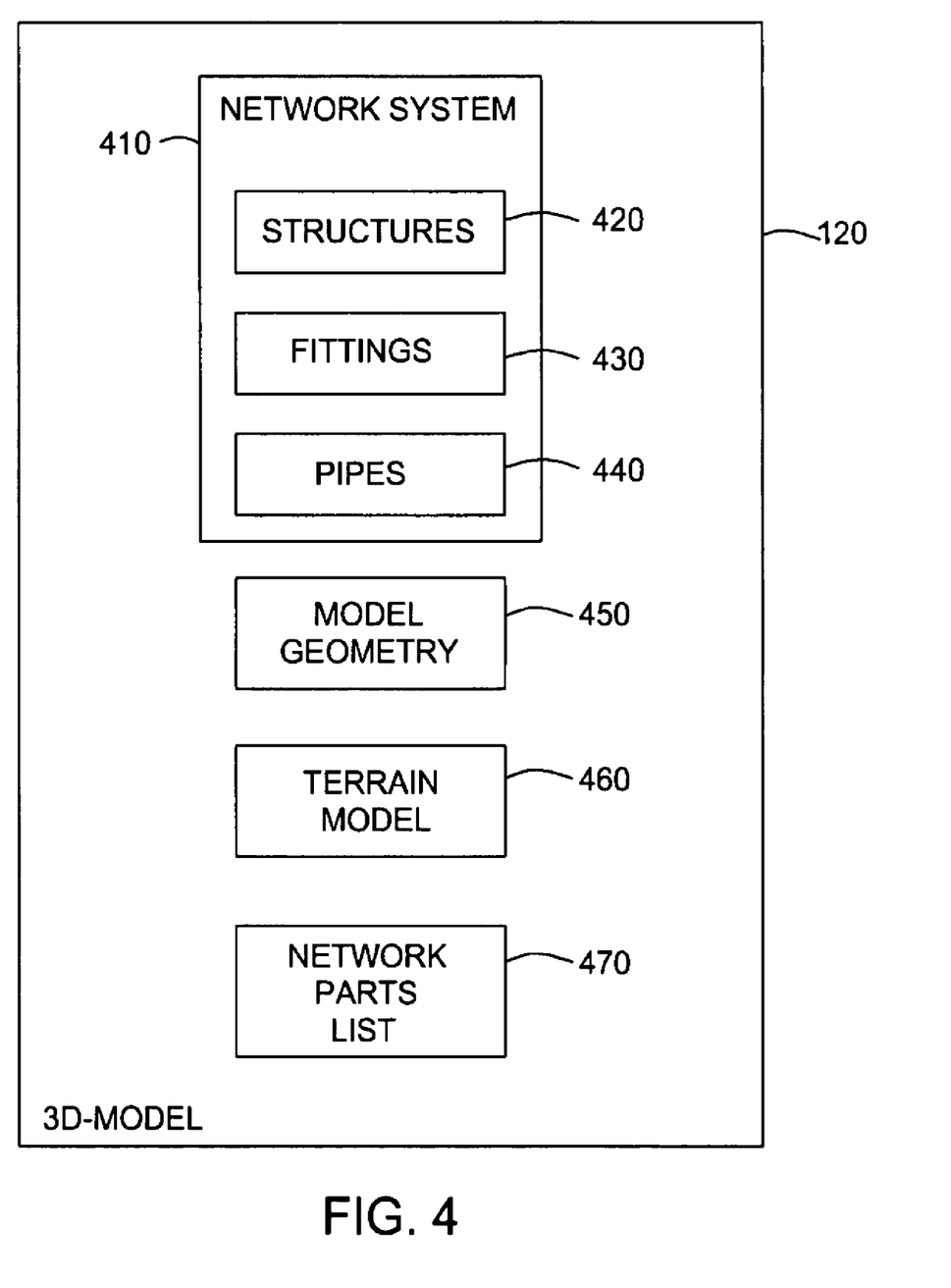
FIG. 4 is a block diagram illustrating data elements used to define a 3D model of a utility network, according to one embodiment of the invention.

FIG. 4 is a block diagram illustrating data elements used to define a 3D model 120, according to one embodiment of the invention. The 3D model 120 includes one or more utility network systems 410, each including the network parts of the particular utility network being modeled. In one embodiment, the individual network parts allow a user to compose a 3D model 120 of a utility network from individual parts, much like a real-world utility network. Regardless of the particular utility network, each network system 410 includes a collection of inter-connected parts. In addition, the 3D model 120 includes model geometry 450, terrain model 460, and network parts list 470.

Network parts list 470 may indicate a collection of parts 3D that may be used to compose a particular utility network 410. Depending on the real-world utility network being modeled, network parts list 470 may be used to limit the parts available for inclusion in a particular 3D model 120. In addition, as the 3D model 120 provides a graphical representation of a corresponding to a real world utility network, the model geometry 450 and terrain model data 460 may define the geography present for a particular location. Typically, the geography represents the real-world location being modeled. Depending on the application, a 3D model may include one or more terrain models 470 and geometry data 460 that may each be used to represent sections of both existing ground surfaces (and sub-surfaces).

Figure 5:
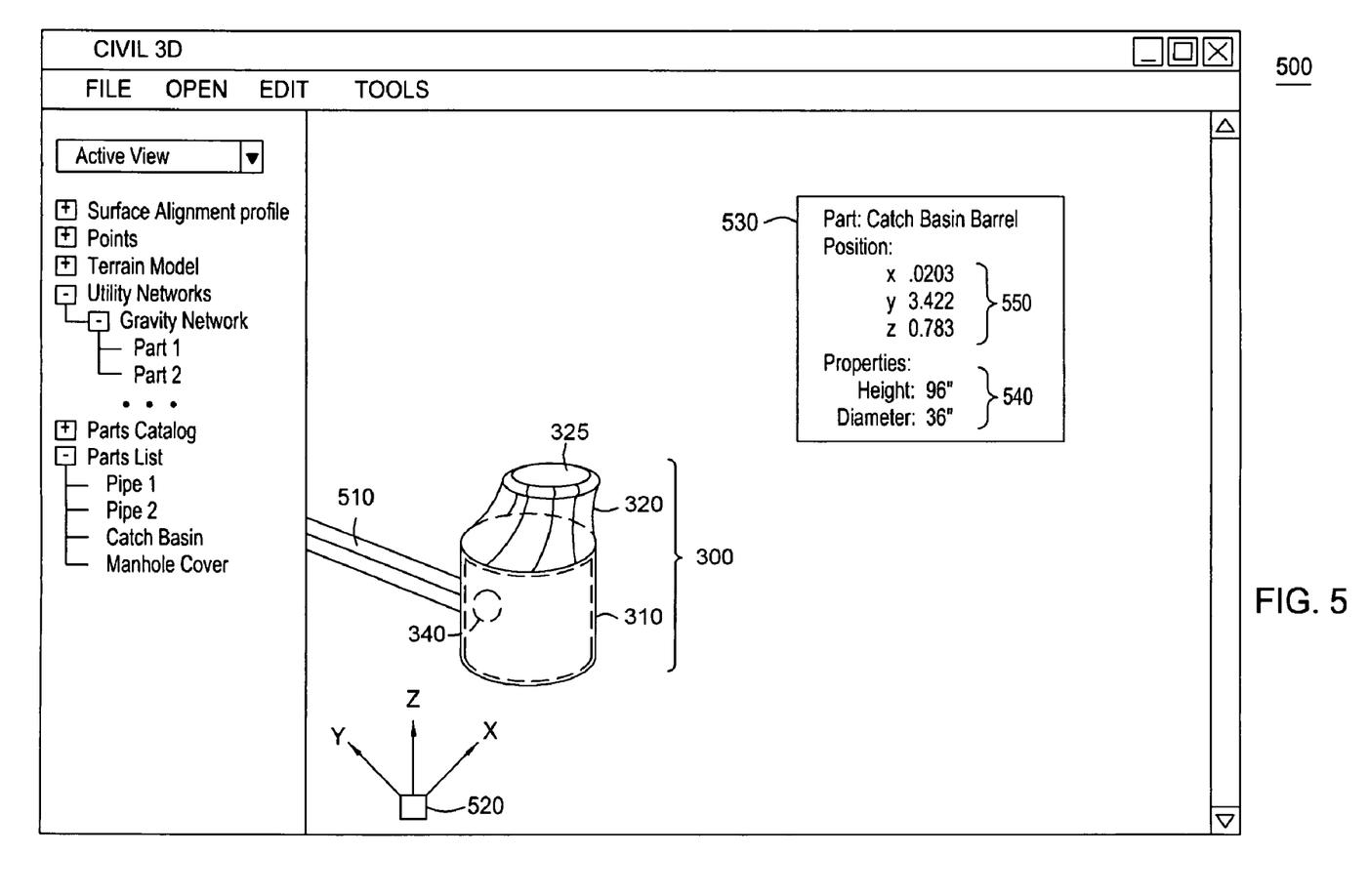
FIG. 5 illustrates a 3D model of a utility network, according to one embodiment of the invention.

FIG. 5 illustrates a portion of a 3D model utility network composed from a collection of network parts 310, according to one embodiment of the invention. In this example, the view 500 in FIG. 5, illustrates a 3D view of a model 120 zoomed in to focus on a catch basin 400 and pipe 510. Perspective indicator 520 indicates that the view 500 illustrates the 3D model 120 from a 3D perspective using the X and Y axes to represent a grid-based location of a part element in the 3D model and the Z axis to represent an elevation. Any of the catch basin elements may be selected and modified, or other parts may be selected and added to the 3D model. For example, a user may click on one more components of the catch basin 400, or may select individual components from the list. Illustratively, barrel section 410 has been selected, as indicated by the dashed lines. The catch basin 300 also includes an outlet port 440, an eccentric barrel cap 420 and a manhole cover 425, corresponding to the same elements from Fig. 3. The view 500 also displays part label annotation 530 for the catch basin 400. The part label corresponds to the network part data for barrel section 410. The annotation 530 displays parametric values 540 selected for this network part, along with instance data specifying the location 550 of the catch basin 400 in a particular 3D model. This data may be included in documentation generated for the 3D model. Further, by modifying any of these values, the user can alter the 3D model without having to manually edit the graphical representation provided for catch basin 400, or having to edit the same network part in multiple views.

Figure 6:
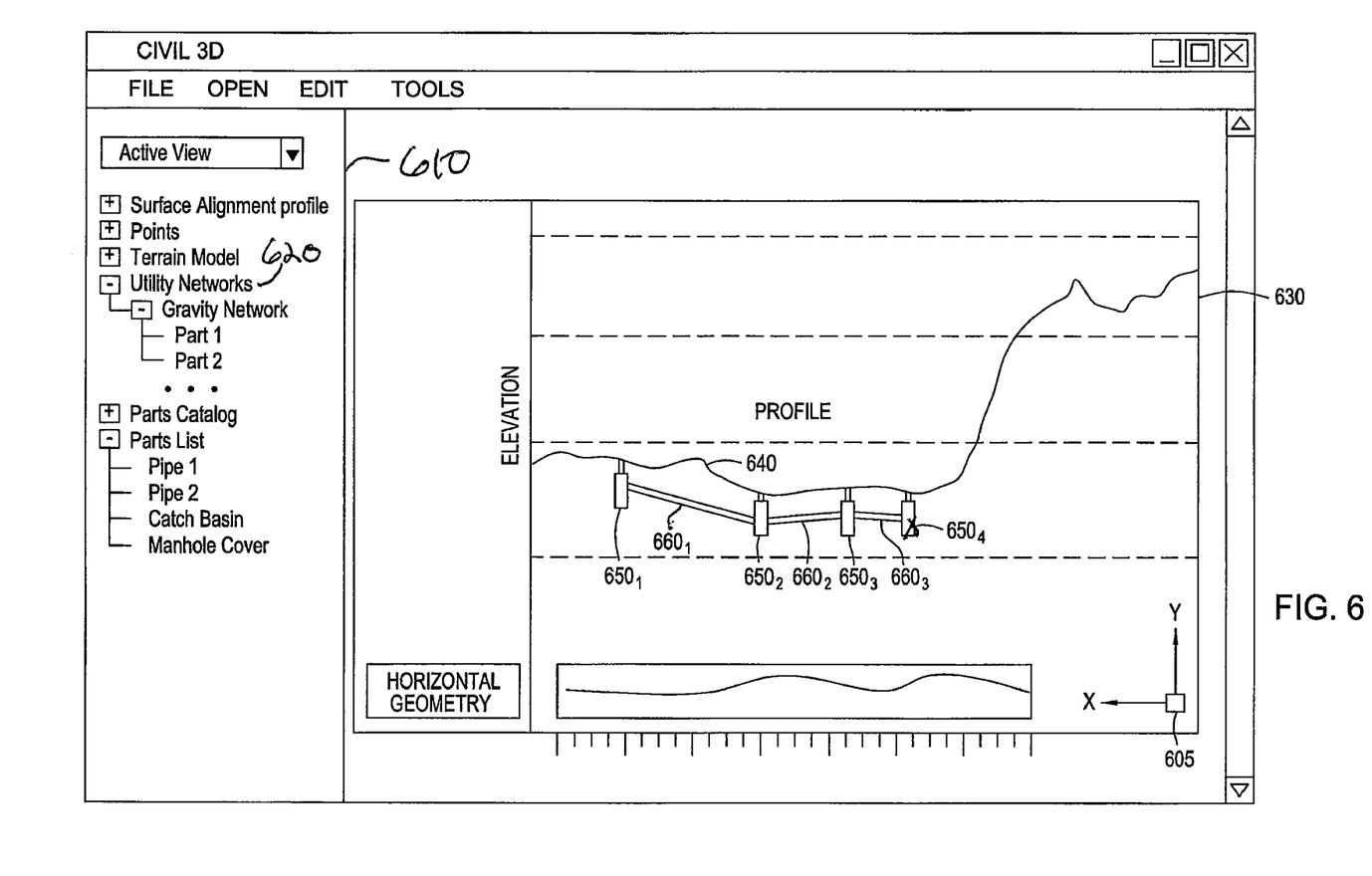
FIG. 6 illustrates a profile view of a utility network, according to one embodiment of the invention.

FIG. 6 illustrates a profile view 600 of a utility network composed from a collection of network parts, according to one embodiment of the invention. The profile view 600 may be generated directly from the network parts present in 3D model 120. Thus, the 2D profile view 600 is generated from the same collection of network parts (e.g., structures 420, fittings 430 and pipes 440) included in the 3D model 120. Further, a 2D view created from the 3D model may be easily edited by changing the attributes associated with a network part, or by changing data values associated with an instance of the network part within the 3D model (e.g., data values specifying the location of the part using coordinates of the terrain model 460).

As changes are made to the model 120, the profile view 600 may be updated, accordingly. As illustrated, the profile view 600 includes a data display area 610. The data display area 610 provides a list of network parts available for in the 3D model. For example, utility networks 620 shows a list of one or more utility networks defined for the 3D model. The model display area 630 shows a profile view of the 3D model 120. Perspective indicator 605 has changed to indicate a two dimensional perspective. Ground surface boundary 640 is based on the model geometry 250 and terrain model data 460. Illustratively, profile view 600 includes four "structure" network parts $650_{1-4}$ connected by three pipe network parts $660_{1-3}$. As shown, the network part $650_4$ corresponds to the catch basin 300 illustrated in FIG. 3 and plan view 500.

In one embodiment, the CAD application 105 may allows a user to select any of the network parts displayed in profile view 600. In response, the CAD application may highlight the selected part and display any data values (e.g., part data 220-250). If a user elects to modify the part, the CAD application may be calculate changes throughout parts connected to the one being modified (e.g., resizing pipe lengths or repositioning pipe connections). Thus, if after modifying an attribute of catch basin $650_4$, the user selects to return to the plan view 500, the CAD application may regenerate the plan view 500 and display a representation of the utility network that includes changes specified using the profile view 600.

Figure 7:
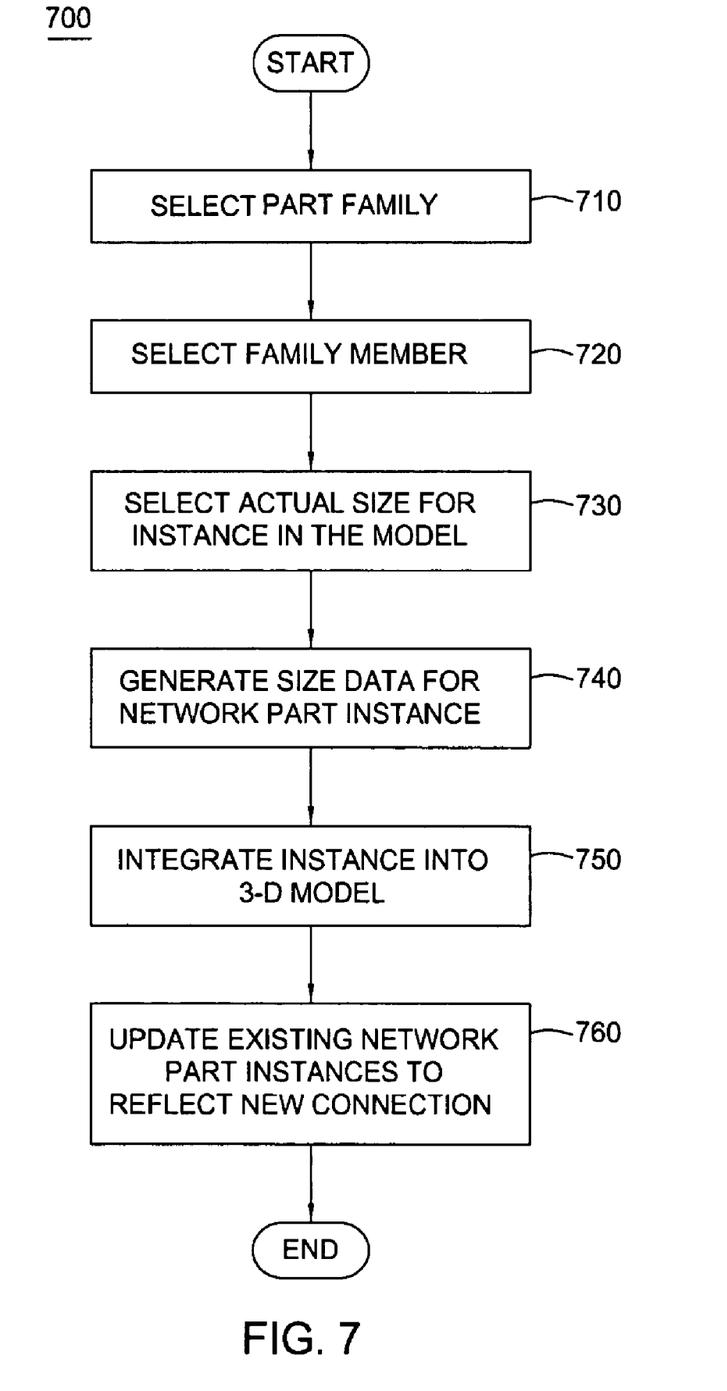
FIG. 7 illustrates a method for composing a 3D model of a utility network, according to one embodiment of the invention.
Figure 8:
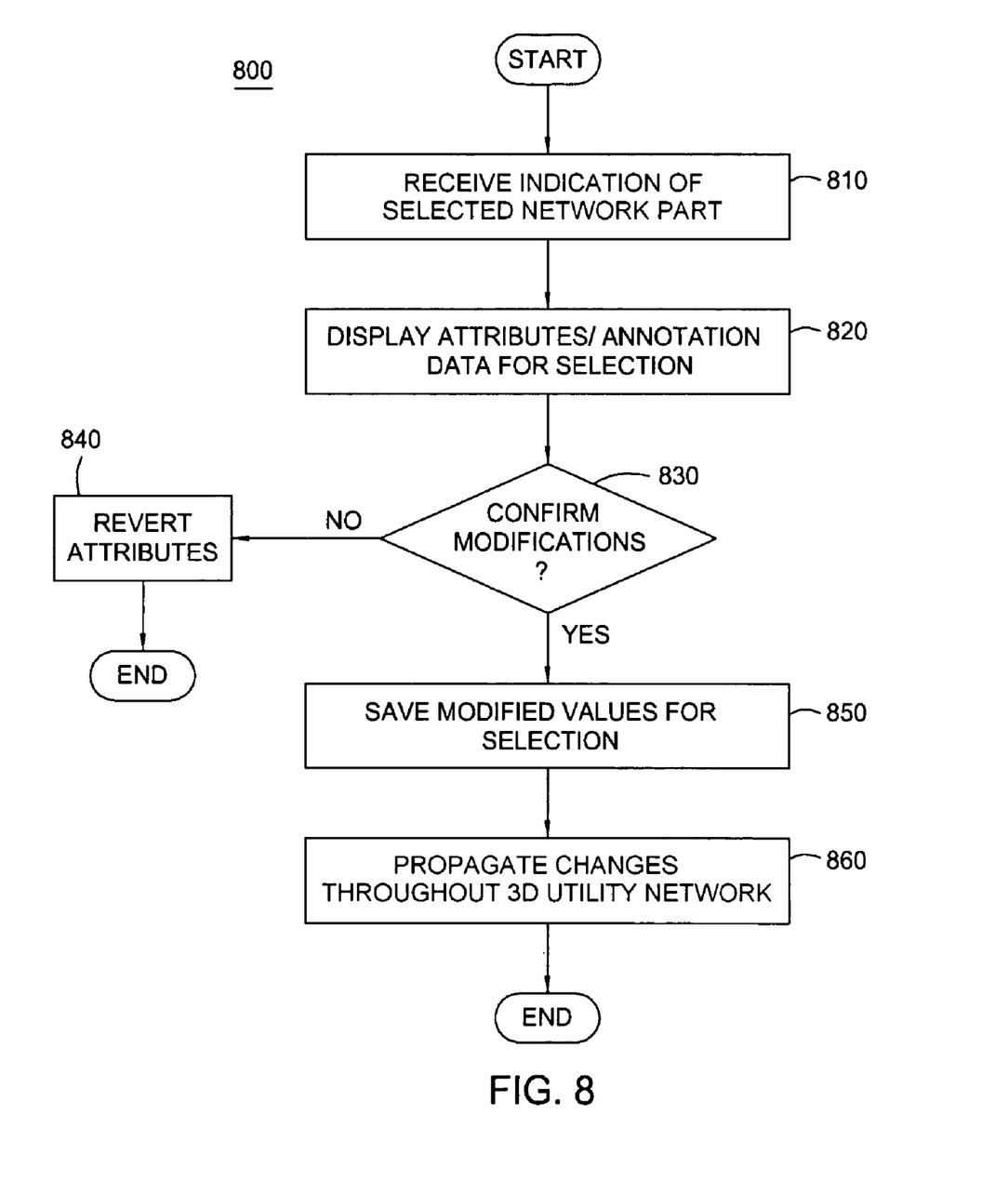
FIG. 8 illustrates a method for modifying the attributes of a utility network, according to one embodiment of the invention.
Figure 9:
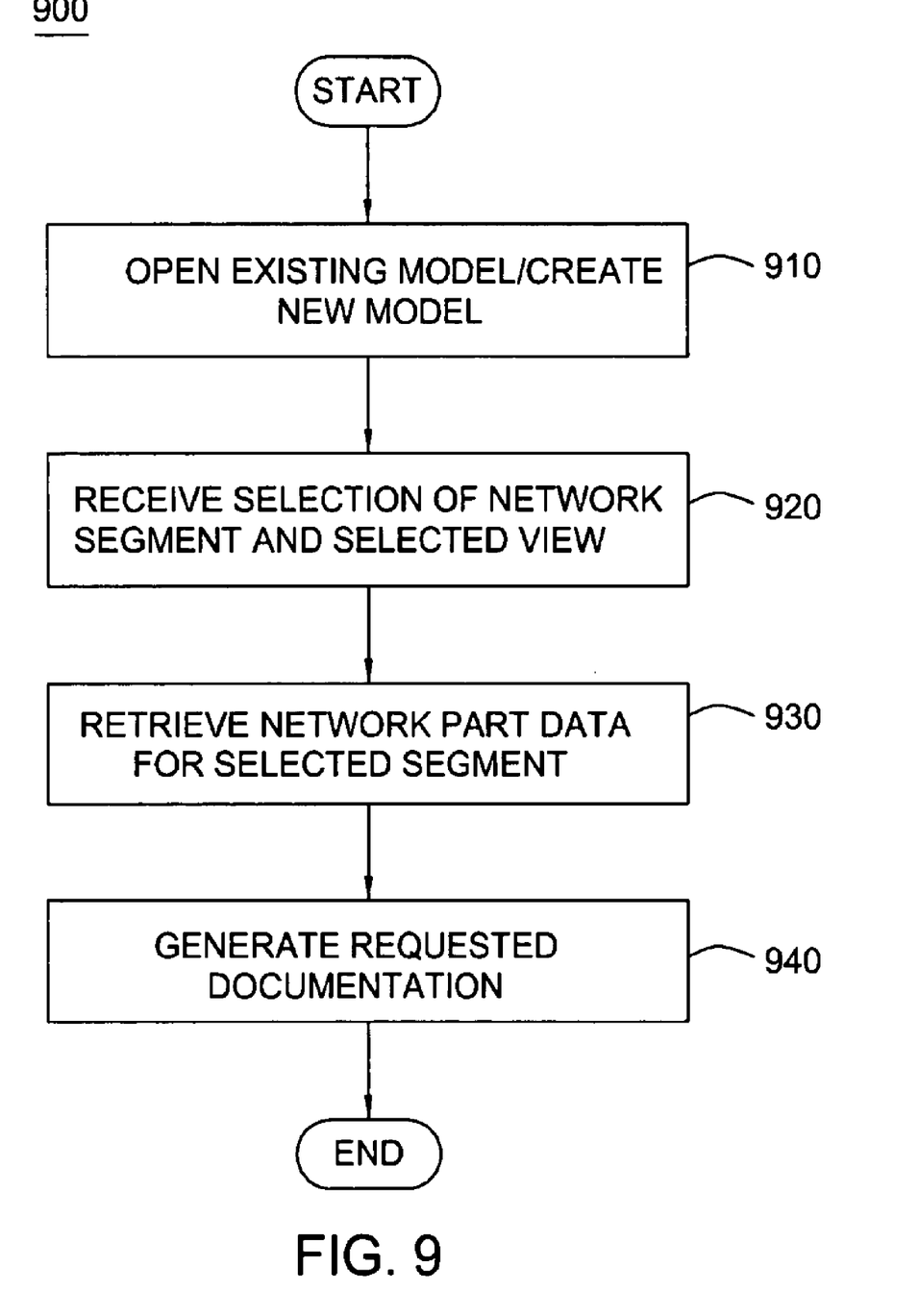
FIG. 9 illustrates a method for generating engineering or construction documentation from a 3D model of a utility network, according to one embodiment of the invention.

FIGS. 7-9 illustrate different actions a user interacting with CAD application 105 may perform to create display and modify a 3D model of a utility network. In these methods, it is assumed that the user is interacting with a CAD application 105 is configured according to an embodiment of the invention, as described above. Thus, the CAD application 105 may be configured to provide a collection of network parts that may be selected and integrated into a 3D model 120; the CAD application may allow a user to switch between multiple views, such as plan, profile, and perspective views; and as network parts are inserted, the CAD application 105 may be configured to update the 3D model 120 to reflect which parts are connected to one another. When switching from one view to another, the display of the 3D model 120 remains updated, and construction and engineering documentation may be generated from the data associated with the network parts in the 3D model.

First, FIG. 7 illustrates a method 700 for composing a 3D model of a utility network, according to one embodiment of the invention. The method begins at step 710 where a user selects a network part from a parts list. First, the user may select a part from a given part family (e.g., a family of similar pipes, or a family of catch basins). Each family provides a group of related network parts. Next, at step 720, the user selects the particular network part family member. At step 730, the user interface 110 may display the current (or default) set of attributes for the selected network part. In response, the user may accept these values or modify them as desired. Once the network part to be added to the 3D model is fully specified, at step 740 the CAD application 105 generates the appropriate size and instance data for a network part instance included in the 3D model. At step 750, the CAD application 105 integrates the instance of the network parts into the 3D model. At step 760, the instance of the network part is attached to others, and data values for the part being added, as well as other parts may be adjusted. The method 700 may be repeated for an arbitrary number of network parts allowing users to add as many parts as required to complete a particular 3D model 120.

FIG. 8 illustrates a method for modifying the attributes of utility network parts, according to one embodiment of the invention. The method 800 begins at step 810 where the CAD application receives an indication that a user has selected a particular part, or group of parts, to modify. For example, from any view of the 3D model 120 (e.g., model view 500 or profile view 600), a user may select a given part by clicking on a graphical representation 350 of the part using a mouse cursor. In addition, the display area 630 may provide a list of all network parts included in a given 3D model, whether visible in the current view or not. Once selected, at step 820, the CAD application may be configured to display the attributes, or annotation data for the selection. For example, a table of attribute/value pairs may be displayed. Once displayed, individual properties may be modified.

Alternatively, the graphical interface 110 may allow a user to add (or move) a network part by dragging and dropping an image of the network part from a catalog display into the currently displayed view of the 3D utility network. Doing so triggers the CAD application 105 to generate the appropriate network part size and position data 220. After the user has selected a location within the current view to place the network part, the CAD application 105 integrates the part into the geometry of the overall utility network being modeled.

At step 830, the user confirms the modifications for a given network part. In one embodiment, changes are not automatically updated until a user confirms a given action. For example, a user may have carefully positioned a group of parts and not wish the position to be continually disrupted by other changes, until confirming that a given change should be propagated throughout the 3D model of a utility network. If the user rejects the modifications, the 3D model may be revered to a prior state at step 840, and the method 800 terminates. Otherwise, at step 850 if the user confirms the modifications, then the modified values for the network part selected at step 810 are saved. At step 860, the CAD application evaluates any parts connected to the network part just modified to determine if the data for any connected part must also be modified.

FIG. 9 illustrates a method for generating engineering or construction documentation from a 3D model of a utility network, according to one embodiment of the invention. The method 900 begins at step 910 where a user interacting with CAD application 105 selects to open an existing 3D model or to create a new 3D model (e.g., according to the methods illustrated in FIGS. 7 and 8). Once completed, the user specifies a segment of the 3D model and a desired view to use in generating construction or engineering documentation for the model. At step 920, the CAD application retrieves the network part data associated with the selected section and view. In addition, the user may specify that the attributes, labels and annotations should be generated with the requested documentation. For example, labels and part annotations may be included in the requested documentation. At step 930, the documentation corresponding to the user selection is generated.

The disclosed CAD application and methods for composing a 3D model of a utility network allow users to construct a utility network from a collection of network parts. Further, the network parts are defined to include attributes that mirror the attributes of their real-world counterparts. Further, the described methods improve the reliability and speed of editing or revising a 3D model of a utility network. For example, modifications to one network part may trigger updates to occur to any connected parts. Users may edit the attributes of the utility network in a 3D model view and subsequently, when 2D construction or engineering documentation is generated, such changes are automatically reflected. Similarly, users may also edit attributes regarding network parts appearing in a 2D view such as a plan view or a profile view and the overall 3D model may be automatically updated without the user intervention required by current systems.

What is claimed is:

1. A computer-implemented method for constructing a three-dimensional (3D) model of a utility network within a computer-aided design (CAD) program executing on a computing device, the method comprising:

receiving a selection of a first network part from a catalog of network parts, wherein each network part in the catalog of network parts comprises a different 3D graphics object and includes associated network part data, wherein the first network part is a composite network part composed from a second and a third network part from the catalog, wherein the composite network part includes the associated network part data for the second and third network parts and composite network part data, and wherein the CAD program is configured to manage the composite network part as a single entity within the 3D model of the utility network based on the composite network part data;

creating an instance of the first network part based on the selection of the first network part, wherein the instance of the first network part includes associated instance data based on the network part data associated with the first network part;

inserting the instance of the first network part into the 3D model of the utility network;

updating the instance data associated with the inserted instance of the first network part based on one or more properties of the 3D model; and wherein the composite network part data associated with the first network part is modified globally within the catalog by the CAD program and wherein the instance data associated with the instance of the first network part in the 3D model is updated based on the modified composite network part data associated with the first network part modified globally within the catalog.

2. The method of claim 1, wherein the composite network part is added to the catalog of network parts and managed globally within the catalog.

3. The method of claim 1, further comprising the step of connecting an instance of the composite network part to the instance of the first network part in the utility network model.

4. The method of claim 2, wherein the instance of the first network part is resized to accommodate the instance of the composite network part.

5. The method of claim 1, further comprising the step of generating a two-dimensional view (2D view) of the utility network model, wherein the 2D view is selected from at least one of a plan view and a profile view.

6. The method of claim 5, further comprising the step of modifying the instance of the first network part present in the utility network model and triggering a corresponding modification of the first network part in the 2D view.

7. The computer-implemented method of claim 1, wherein the step of inserting the instance of the first network part includes the step of connecting the instance of the first network to an instance of a fourth network part included in the 3D model.

8. The computer-implemented method of claim 7, wherein the step of updating the instance data associated with the instance of the first network part includes the step of storing connection data associated with the fourth network part.

9. The computer-implemented method of claim 1, wherein the network part data associated with the first network part includes part size data, part connection data, part subcomponents data and part body data.

10. A computer-readable medium containing a program which when executed by a processor, performs operations for constructing a three-dimensional (3D) model of a utility network, by performing the steps of:

receiving a selection of a first network part from a catalog of network parts, wherein each network part in the catalog of network parts comprises a different 3D graphics object and includes associated network part data, wherein the first network part is a composite network part composed from a second and a third network part from the catalog, wherein the composite network part includes the associated network part data for the second and third network parts and composite network part data, and wherein the CAD program is configured to manage the composite network part as a single entity within the 3D model of the utility network based on the composite network part data;

creating an instance of the first network part based on the selection of the first network part, wherein the instance of the first network part includes associated instance data based on network part data associated with the first network part;

inserting the instance of the first network part into the 3D model of the utility network;

updating the instance data associated with the inserted instance of the first network part based on one or more properties of the 3D model; and wherein the composite network part data associated with the first network part is modified globally within the catalog by the CAD program and wherein the instance data associated with the instance of the first network part in the 3D model is updated based on the modified composite network part data associated with the first network part modified globally within the catalog.

11. The computer-readable medium of claim 10, wherein the composite network part is added to the catalog of network parts and managed globally within the catalog.

12. The computer-readable medium of claim 11, wherein the instance of the first network part is resized to accommodate the instance of the composite network part.

13. The computer-readable medium of claim 10, further comprising the step of connecting an instance of the composite network part to the instance of the first network part in the utility network model.

14. The computer-readable medium of claim 10, comprising the step of generating a two-dimensional view (2D view) of the utility network model, wherein the 2D view is selected from at least one of a plan view and a profile view.

15. The computer-readable medium of claim 14, further comprising the step of modifying the instance of the first network part present in the utility network model and triggering a corresponding modification of the first network part in the 2D view.

16. The computer-readable medium of claim 10, wherein the step of inserting the instance of the first network part includes the step of connecting the instance of the first network to an instance of a fourth network part included in the 3D model.

17. The computer-readable medium of claim 16, wherein the step of updating the instance data associated with the instance of the first network part includes the step of storing connection data associated with the fourth network part.

18. The computer-readable medium of claim 10, wherein the network part data associated with the first network part includes part size data, part connection data, part subcomponents data and part body data.

19. A computing device, comprising:

a processor; and a memory configured to store an application that includes instructions which, when cause the processor to perform operations for constructing a computer generated three dimensional model (3D model) of a real-world utility network, including the steps of:

receiving a selection of a first network part from a catalog of network parts, wherein each network part in the catalog of network parts comprises a different 3D graphics object and includes associated network part data, wherein the first network part is a composite network part composed from a second and a third network part from the catalog, wherein the composite network part includes the associated network part data for the second and third network parts and composite network part data, and wherein the CAD program is configured to manage the composite network part as a single entity within the 3D model of the utility network based on the composite network part data;

creating an instance of the first network part based on the selection of the first network part, wherein the instance of the first network part includes associated instance data based on network part data associated with the first network part;

inserting the instance of the first network part into the 3D model of the utility network;

updating the instance data associated with the inserted instance of the first network part based on one or more properties of the 3D model; and wherein the composite network part data associated with the first network part is modified globally within the catalog by the CAD program and wherein the instance data associated with the instance of the first network part in the 3D model is updated based on the modified composite network part data associated with the first network part modified globally within the catalog.

* * * * *